United States Patent [19]  [11]  4,315,088
Kitagawa et al. [45] Feb. 9, 1982

[54] PROCESS FOR PRODUCING α-OLEFIN POLYMER

[75] Inventors: Sadao Kitagawa; Isao Okada; Teruo Saito, all of Ami, Japan

[73] Assignee: Mitsubishi Petrochemical Co., Ltd., Tokyo, Japan

[21] Appl. No.: 102,467

[22] Filed: Dec. 11, 1979

[30] Foreign Application Priority Data

Dec. 15, 1978 [JP] Japan ................... 53/154705

[51] Int. Cl.³ .................... C08F 4/02; C08F 10/04
[52] U.S. Cl. .................... 526/125; 252/429 B; 526/122; 526/348; 526/348.6; 526/351; 526/906
[58] Field of Search ............ 526/125, 127, 122

[56] References Cited

U.S. PATENT DOCUMENTS

| | | | |
|---|---|---|---|
| 3,787,323 | 1/1974 | Oishima et al. | 526/127 |
| 4,071,672 | 1/1978 | Kashiwa | 526/125 |
| 4,107,414 | 8/1978 | Giannini et al. | 526/125 |
| 4,146,502 | 3/1979 | Yokoyama et al. | 526/125 |
| 4,157,435 | 6/1979 | Toyota et al. | 526/125 |
| 4,168,361 | 9/1979 | Oda et al. | 526/906 |

FOREIGN PATENT DOCUMENTS

| | | | |
|---|---|---|---|
| 2701647 | 7/1977 | Fed. Rep. of Germany | 526/125 |
| 2757725 | 7/1978 | Fed. Rep. of Germany | 526/124 |
| 2818642 | 11/1978 | Fed. Rep. of Germany | 526/125 |
| 50-44273 | 4/1975 | Japan | 526/125 |

*Primary Examiner*—Edward J. Smith
*Attorney, Agent, or Firm*—Sughrue, Mion, Zinn, Macpeak & Seas

[57] ABSTRACT

This invention relates to a process for producing an α-olefin polymer having a high stereoregularity in a high yield by polymerizing α-olefin in the presence of a catalyst composed of solid catalyst component (I) prepared by contacting (A) magnesium halide, (B) aromatic carboxylic acid ester, (C) halogen compound of titanium, and (D) siloxyaluminum compound with each other, and (II) an organometallic compound of a metal of Group I to III in the Periodic Table.

15 Claims, No Drawings

PROCESS FOR PRODUCING α-OLEFIN POLYMER

BACKGROUND OF THE INVENTION

1. Field of the Invention

This invention relates to a process for producing an α-olefin polymer using an improved Ziegler-Natta catalyst.

2. Description of the Prior Art

Recent years have seen a remarkable development of catalysts for obtaining α-olefin polymers with a high stereoregularity in a high yield. In particular, it is known that the use of a solid catalyst component comprising a carrier mainly composed of magnesium halide compound having supported thereon a transition metal compound as a transition metal component remarkably increases the activity per unit weight of transition metal, and that polymers with a high stereoregularity can be obtained if an electron donor is present upon preparation of the solid catalyst component. Typical processes for preparing such solid catalyst components include pulverizing anhydrous magnesium chloride together with an electron donor and a titanium halide complex (British Pat. No. 1,387,888 to 1,387,890); pulverizing anhydrous magnesium chloride together with an electron donor and a silicon halide compound, and treating the co-pulverized product with titanium tetrahalide (British Pat. No. 1,492,618); and pulverizing anhydrous magnesium chloride together with an electron donor and treating the co-pulverized product with a tetravalent titanium halide compound (Japanese Patent Publication No. 50037/77).

From the standpoint of simplifying or eliminating the step of removing a catalyst residue remaining in the product α-olefin polymer, it goes without saying that the lower the content of the catalyst residue in the product α-olefin polymer is, the better. For this reason, a high polymerization activity per unit weight of transition metal has been eagerly desired as well as a high content of transition metal compound in the solid catalyst.

From this standpoint, the above-described processes are still unsatisfactory and several improved processes have been proposed. For example, there are processes of using, as one constituent of the solid catalyst component, an aluminum halide-ether complex as described in Japanese Patent Application (OPI) No. 73991/77 (The term "OPI" as used herein refers to a "published unexamined Japanese patent application"), an alkoxyaluminum compound as described in West German patent application (OLS) No. 2,701,647, or an alcohol or phenol as described in West German Patent Application (OLS) No. 2,708,588. In these processes, however, catalyst performance is still not fully satisfactory. An increase in the transition metal content in the solid catalyst usually results in reduction of polymerization activity per unit weight of transition metal, thus the advantages of an improvement in the transition metal content in the solid catalyst are cancelled or results in reduction of stereoregularity of the α-olefin polymer (or isotactic index, hereinafter abbreviated as I.I.), thus practical values are spoiled.

The inventors have already disclosed in West German Patent Application (OLS) No. 2,818,642 a process of preparing a catalyst by pulverizing a solid reaction product of magnesium hydroxychloride and ethylaluminum dichloride together with ethyl benzoate and a siloxyaluminum compound, and reacting the co-pulverized product with titanium tetrachloride. However, the step of preparing the carrier in this process is complicated and thus the process is economically disadvantageous. Furthermore, the reproducibility of polymerization performance of the produced solid catalyst is poor.

SUMMARY OF THE INVENTION

A principal object of the present invention is to inexpensively provide a solid catalyst component which contains titanium in a high content, which overcomes the above-described defects, which shows a remarkably high polymerization activity per unit weight of titanium, and which provides an α-olefin polymer having a high isotactic index.

The above-described object is attained using the process of the present invention which is characterized by polymerizing an α-olefin in the presence of a catalyst composed of:

(I) a solid catalyst component prepared by contacting (A) a magnesium halide, (B) an aromatic carboxylic acid ester, (C) a halogen compound of titanium, and (D) a siloxyaluminum compound with each other; and (II) an organometallic compound of a metal of Group I, II, or III in the Periodic Table.

The solid catalyst component prepared by the process of the present invention contains titanium in a high content and shows a remarkably high activity for polymerizing α-olefin per unit weight of titanium. In addition, α-olefin polymers having a high isotactic index are produced. It was not expected from known facts that the particular siloxyaluminum compounds used in the process of the present invention provide the abovedescribed effects.

DETAILED DESCRIPTION OF THE INVENTION

I. Preparation of solid catalyst component

The solid catalyst used in the present invention is obtained by contacting at least the following constituents A to D with each other.

(1) Constituents

Ingredient A

Ingredient A is a magnesium halide (e.g., a fluoride, chloride, bromide, or iodide). A composition composed essentially of magnesium halide obtained by the reaction between various magnesium compounds (e.g., a Grignard reagent, a magnesium alkoxide or aryloxide, an alkoxy- or aryloxymagnesium halide, etc.) and a halogenating agent is also suitable. These magnesium halides are preferably anhydrous, though water may be present up to an amount which does not influence the catalyst's performance. Of these compounds, magnesium chloride is preferred.

Ingredient B

The aromatic carboxylic acid ester used as ingredient B may be represented by the following general formulae:

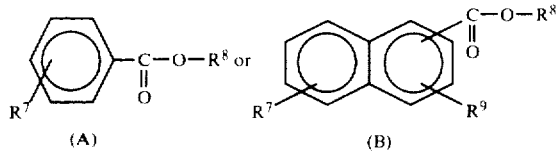

(A)  (B)

wherein $R^7$ and $R^9$ each represents a hydrogen atom, an aliphatic or aromatic hydrocarbon residue (preferably aliphatic) containing about 1 to 20 and preferably about 1 to 10 carbon atoms, and an alkoxy or aryloxy group containing about 1 to 20, preferably about 1 to 10 carbon atoms which may be straight chain, branched chain or cyclic; and $R^8$ represents an aliphatic or aromatic hydrocarbon or halogenated hydrocarbon residue containing about 1 to 20, preferably about 1 to 10 carbon atoms and 1 to 5, preferably 1 to 2 halogen atoms in the case of the halogenated hydrocarbon (F, Cl, Br, or I, preferably Cl or Br).

Of the above compounds, those represented by the general formula (A) are preferred. Specific examples thereof include methyl benzoate, ethyl benzoate, isopropyl benzoate, methyl toluylate, ethyl toluylate, methyl anisate, ethyl anisate, etc. Representative examples of the compounds represented by the general formula (B) include ethyl α-naphthoate, methyl α-naphthoate, methyl β-naphthoate, ethyl β-naphthoate, ethyl 4-methyl-1-naphthalenecarboxylate, ethyl 6-methoxy-1-naphthalenecarboxylate, etc.

As these aromatic carboxylic acid esters, previously isolated and purified esters of course can be used. In addition, this invention includes not directly using such aromatic carboxylic acid esters but performing a reaction by which the ester is produced (for example, a reaction between aromatic carboxylic acid halide and an ether, alcohol, or alkoxy compound of a given element) somewhere in the course of preparing the solid catalyst component such that the ester is present in the solid catalyst component.

Ingredient C

As the halogen compound of titanium of ingredient C, halogen compounds of di-, tri- and tetravalent titanium, preferably halogen compounds of tri- and tetravalent titanium, more preferably halogen compounds of tetravalent titanium are used. The halogen may be fluorine, chlorine, bromine or iodine, but preferably chlorine or bromine.

Halogen compounds of tetravalent titanium are usually represented by the formula:

$$Ti(OR^{10})_m X_{4-m}$$

wherein $R^{10}$ represents an aliphatic or aromatic hydrocarbon residue containing about 1 to 15 and preferably about 1 to 8 carbon atoms; X represents a chlorine or bromine atom, and m represents a number of 0 to 3. Representative examples are titanium tetrachloride, titanium tetrabromide, methoxytitanium trichloride, di-n-butoxytitanium dichloride, trimethoxytitanium chloride, etc., with titanium tetrachloride being most preferred.

Ingredient D

Ingredient D is the characteristic ingredient of the present invention and is a siloxyaluminum compound. The term "siloxyaluminum compound" as used herein refers to a compound containing an —Si—O—Al bond. The siloxyaluminum compounds include siloxyaluminum compounds represented by the following general formula:

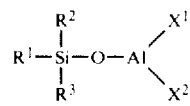

wherein $R^1$, $R_2$ and $R^3$ are the same or different and each represents a hydrogen atom, a halogen atom (e.g., F, Cl, Br, I), an aliphatic or aromatic hydrocarbon residue (preferably aliphatic and usually containing 1 to 20 and preferably 1 to 8 carbon atoms), or $R^4$($-SiR^5 R^6$$-$$O)_n$ (wherein $R^4$, $R^5$ and $R^6$ each represents a hydrogen atom, a halogen atom or an aliphatic or aromatic hydrocarbon residue (preferably aliphatic and usually containing 1 to 20 and preferably 1 to 8 carbon atoms), and n represents an integer of 1 to 20, preferably 1 to 10, and most preferably 1 to 5), $X^1$ represents a halogen atom (e.g., F, Cl, Br, I), $X^2$ represents a halogen atom (e.g., F, Cl, Br, I) or $R^1R^2R^3Si$—O—.

These siloxyaluminum compounds can generally be prepared by the reaction of a silanol compound and an organoaluminum halide or of a siloxane compound and an aluminum halide. For example, Saegusa et al., Kogyo Kagaku Zasshi, 68, p. 2514, (1965), Japan, discloses the reaction of silanol and an organoaluminum compound, for example,

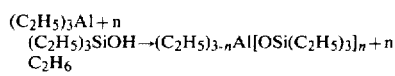

It can be assumed from the above teaching that the reaction

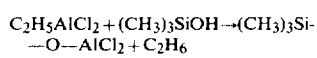

proceeds easily. Doklady Akademii Nauk U.S.S.R., 114, 1033 (1957) and Chemical Abstracts, 52, 2742 (1958) disclose the following reaction of a siloxane compound and an aluminum halide

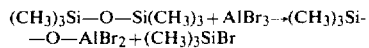

The reactions between a silanol compound and an organoaluminum halide and between a siloxane compound and an aluminum halide can generally be conducted by contacting the two materials for several minutes to several hours with each other in the presence or absence of a solvent at temperatures of −10° C. to 150° C., preferably 0° C. to 100° C. In these reactions, representative silanols include trimethyl silanol, triethyl silanol, triphenyl silanol, etc. Representative organoaluminum halides are diethylaluminum chloride, ethylaluminum dichloride, ethylaluminum sesquichloride, etc. Typical siloxanes are hexamethyldisiloxane, dimethylpolysiloxane, hexachlorodisiloxane, 1,3-dihydrotetramethyldisiloxane, 1,3-dihydro-tetraphenyldisiloxane, 1,3-dichloro-tetramethyldisiloxane, 1,3-dichloro-tetraphenyldisiloxane, diphenylpolysiloxane, phenylmethylpolysiloxane, methylhydroxydienepolysiloxane, phenylhydrodienepolysiloxane, etc. As the aluminum halides, aluminum chloride, aluminum bromide, ethylaluminum dichloride, diethylaluminum chloride, ethylaluminum sesquichloride, etc., can be used. As the solvents, inert aliphatic hydrocarbons such as pentane, hexane, heptane or octane; aromatic hydrocarbons such as benzene, toluene or xylene; alicyclic hydrocarbons such as cyclopentane or cyclohexane; halogenated aliphatic or aromatic hydrocarbons such as dichloromethane, tetrachloroethylene, o-, m- or p-dichlorobenzene or chlorobenzene, etc., can be used.

Ingredient D can be prepared according to the above-described reactions and isolated from the reaction mixture. In addition, it is also possible to contact the starting materials for preparing ingredient D (for example, hexamethyldisiloxane and aluminum chloride) with each other somewhere in the process of producing the solid catalyst component, thereby to eventually incorporate ingredient D in the solid catalyst component. However, such catalyst ingredient provides deteriorated catalytic performance as compared with that previously prepared and isolated. Thus, it is preferred to use a previously prepared and isolated ingredient D.

Specific examples of these compounds are: trimethylsiloxyaluminum dichloride, triethylsiloxyaluminum dichloride, triphenylsiloxyaluminum dichloride, trichlorosiloxyaluminum dichloride, dimethylhydrosiloxyaluminum dichloride, diphenylhydrosiloxyaluminum dichloride, dimethylchlorosiloxyaluminum dichloride, diphenylchlorosiloxyaluminum dichloride, bis(trimethylsiloxy)aluminum chloride, bis(triethylsiloxy)aluminum chloride, bis(triphenylsiloxy)aluminum chloride, a reaction product between dimethylpolysiloxane and aluminum chloride, a reaction product of diphenylpolysiloxane and aluminum chloride, a reaction product of phenylmethylpolysiloxane and aluminum chloride, a reaction product of methylhydrogenpolysiloxane and aluminum chloride, a reaction product of phenylhydrogenpolysiloxane and aluminum chloride, and those wherein chlorine atom in the abovedescribed siloxyaluminum compounds bonded to aluminum is replaced by bromine or iodine atom.

Of these siloxyaluminum compounds, siloxyaluminum chlorides are preferably used and, of the siloxyaluminum chlorides, trimethylsiloxyaluminum dichloride, triethylsiloxyaluminum dichloride, triphenylsiloxyaluminum dichloride, trichlorosiloxyaluminum dichloride, a reaction product of dimethylpolysiloxane and aluminum chloride (Si/Al=1/1 (atomic ratio)), a reaction product of methylphenylpolysiloxane and aluminum chloride (Si/Al=1/1 (atomic ratio)), and a reaction product of methylhydrogenpolysiloxane and aluminum chloride (Si/Al=1/1 (atomic ratio)) are preferably used.

(2) Preparation of the solid catalyst component

Processes for preparing the solid catalyst component are not particularly limited as long as they involve the steps of contacting at least ingredients A, B, C and D with each other. To contact the ingredients, they can be mixed as such, they can be mixed and mechanically milled and/or they can be suspended or dissolved in an inert solvent. Of these, a process involving mechanical milling is preferred. In particular, a process involving the step of contacting ingredient A with ingredient D by mechanical co-milling is favorable. As the mechanically milling means, there can be used known mechanically milling apparatuses such as a vibrational mill, a rotary mill, an impact mill, etc. Usually, about 10 minutes to 100 hours milling or pulverizing is sufficient.

Upon mechanical milling, it is possible to add halides (i.e., fluorides, chlorides, bromides, or iodides) of elements of Groups IVb, Vb, and VIb in the Periodic Table, specifically, silicon tetrachloride, antimony trichloride, tin tetrachloride, phosphorus trichloride, phosphorus pentachloride, phosphorus oxychloride, bismuth trichloride, tellurium tetrachloride, etc. These compounds should be used in an amount not more than equimolar to the siloxyaluminum compound. If used in a larger amount in some cases they can inhibit the siloxyaluminum compounds from fully exhibiting their effects. The addition of these halides makes it possible to prevent adherence of catalyst component during co-pulverization, improve the stereoregularity of the polymer, control the molecular weight distribution of the polymer and improve the polymerization activity of the catalyst component.

Inert solvents used for suspending or dissolving the ingredients should not detrimentally influence the properties of the solid catalyst component. As examples of such inert solvents, there are illustrated aliphatic saturated hydrocarbons such as pentane, hexane, heptane, octane, decane, etc.; alicyclic saturated hydrocarbons such as cyclopentane, cyclohexane, methylcyclohexane, etc.; aromatic hydrocarbons such as benzene, toluene, xylene, etc.; kerosene; light oil; aliphatic halogenated hydrocarbons such as chloroform, carbon tetrachloride, ethyl chloride, propyl chloride, butyl chloride, allyl chloride, isobutyl chloride, dichloromethane, 1,1-dichloroethane, 1,2-dichloroethane, 1,2-dibromoethane, 1,1,2,2-tetrachloroethane, 1,1,1-trichloroethane, 1,1,2-trichloroethane, cis-1,2-dichloroethylene, pentachloroethane, hexachloroethane, tetrachloroethylene, trichloroethylene, 1,2-dichloropropane, 2,2-dichloropropane, 1,1-dichloropropane, 1,2-dichloro-2-methylpropane, 1,2-dichlorobutane, 1,4-dichlorobutane, 1-chloropentane, 4-chloroheptane, cis-1,2-dibromoethylene, meso-2,3-dibromobutane, o-dibromobenzene, allyl bromide, i-butyl bromide, i-propyl bromide, ethyl bromide, bromocyclohexane, n-butyl bromide, sec-butyl bromide, t-butyl bromide, n-proyl bromide, methyl bromide, 1,1,2,2-tetrabromoethane, 1,1,1-trichloroethane, 1,2,3-tribromopropane, 1-bromo-2-chloroethane, cis-bromochloroethylene, o-bromochlorobenzene, i-butyl iodide, i-propyl iodide, ethyl iodide, n-butyl iodide, t-butyl iodide, n-propyl iodide, methyl iodide, etc.; halogenated alicyclic hydrocarbons such as chlorocyclopentane, 1,2-dichlorocyclopentane, chlorocyclohexane, 1,2-dichlorocyclohexane, 1-methyl-2-chlorocyclohexane, 1,3-dichlorocyclohexane, 1,3-dichloro-2-methylcyclohexane, chloromethylcyclohexane, dichloromethylcyclohexane, 1,2-dibromocyclohexane, etc.; halogenated aromatic hydrocarbons such as chlorobenzene, o-dichlorobenzene, m-dichlorobenzene, p-dichlorobenzene, o-dibromobenzene, trichloromethylbenzene, trifluoromethylbenzene, o-bromochlorobenzene, o-chlorotoluene, p-chlorotoluene, 2,6-dichlorotoluene, o-dibromobenzene, 1,2-dichloronaphthalene, etc.; and the mixtures thereof.

The thus prepared titanium-containing solid may be further treated with a halogen such as iodine or bromine, or with an interhalogen compound such as iodine trichloride or iodine monochloride. Treatment with a halogen or interhalogen compound improves the polymerization activity of the titanium-containing solid and also improves the stereoregularity of the polymer. This treatment is conducted in the presence of an inert solvent and improves the polymerization activity and isotactic index.

Illustrative methods of contacting the ingredients are set forth below.

(i) Co-pulverizing ingredients A, B and D and contacting the product with ingredient C in a slurry state, followed by washing.

(ii) Adding ingredient B to a co-pulverized mixture of ingredients A and D, co-pulverizing them, adding ingredient C thereto, and co-pulverizing them, followed by washing with an inert solvent.

(iii) Adding ingredient B to a co-pulverized mixture of ingredients A and D, co-pulverizing them, adding thereto ingredient C, co-pulverizing them, and treating the co-pulverized product with halogen such as iodine or interhalogen compound such as iodine trichloride in an inert solvent, followed by washing.

(iv) Treating a co-pulverized mixture of ingredients A, B, C and D with halogen or interhalogen compound in a halogenated hydrocarbon, and washing the treated mixture.

(v) Contacting a co-pulverized mixture of ingredients A, B, D and a halogen compound of an element of Group IVb, Vb, or VIb in the Periodic Table with ingredient C, followed by washing.

(vi) Treating a co-pulverized mixture of ingredients A, B, C and D and a halogen compound of an element of Group IVb, Vb , or VIb in the Periodic Table with a halogen or an interhalogen compound in halogenated hydrocarbon, followed by washing.

(vii) Contacting a co-pulverized mixture of ingredients A, D and aromatic carboxylic acid halide with ingredient C in the presence of an alkoxy or aryloxy group-containing compound (for example, alcohols, ethers, and alkoxy or aryloxy compounds of various elements), followed by washing.

Of these, methods (i), (ii), (iii), (v) and (vii) are preferred, with (i) and (iii) being more preferred.

In the above-described methods (i), (v) and (vii), the contact of the co-pulverized product with ingredient C and others may be carried out in a solvent or in large excess of liquid ingredient C without using a solvent. The term "liquid ingredient C" includes a melt of ingredient C under reaction conditions or a solution of ingredient C in a solvent. As the solvents which may be used, the above-described aliphatic saturated hydrocarbons, alicyclic saturated hydrocarbons, aromatic hydrocarbons, kerosene, light oil, etc., enable one to fully obtain the effects of the present invention. Of these, halogenated hydrocarbons, especially halogenated hydrocarbons having a dielectric constant of not less than 3, particularly not less than about 6, at 10° to 50° C. are preferred because they provide much higher polymerization activity per unit weight of titanium in resulting solid component (I). In addition the use of halogenated hydrocarbon with such a high dielectric constant expands the region of optimal amounts of ingredient B upon co-pulverization and improves the content of supported titanium in the solid component (I) as compared with the use of other solvents. Where a solvent having a low dielectric constant, particularly a dielectric constant of 3 or less at 10° to 50° C., is used, the amount of ingredient B during co-pulverization is limited. For example, if 1 mole of ingredient A and 0.23 mole or more, particularly 0.30 mole or more, of ingredient B are co-pulverized and the co-pulverized product and ingredient C are reacted in a solvent having a dielectric constant of 3 or less at 10° to 50° C., the amount (content) of titanium in the solid catalyst product is small, the polymerization activity is low and the stereoregularity of the polymer is poor. On the other hand, where the same co-pulverized product is brought into contact with ingredient C in a halogenated hydrocarbon having a dielectric constant of 6 or more, particularly 9 or more, a solid catalyst component of a high titanium content is obtained which has a remarkably high polymerization activity and stereoregularity of the polymer. Thus where a solvent of high dielectric constant is used, the amount of ingredient B in the co-pulverized product can vary in a wide range and a high performance catalyst can be produced.

Examples of such halogenated hydrocarbons having the above-described characteristics and having a dielectric constant of not less than about 6 at 10° to 50° C. are 1,2-dichloroethane, 1,1,2,2-tetrachloroethane, o-dichlorobenzene, allyl chloride, isobutyl chloride, ethyl chloride, chlorocyclohexane, n-butyl chloride, n-propyl chloride, benzyl chloride, p-chlorotoluene, 4-chloroheptane, 1-chloropentane, 1,1-dichloroethane, cis-1,2-dichloroethylene, 1,4-dichlorobutene, 1,2-dichloropropane, 2,2-dichloropropane, dichloromethane, 1,2-dichloro-2-methylpropane, cis-1,2-dibromoethylene, meso-2,3-dibromoethane, o-dibromobenzene, allyl bromide, i-butyl bromide, i-propyl bromide, ethyl bromide, bromocyclohexane, n-butyl bromide, sec-butyl bromide, t-butyl bromide, n-propyl bromide, methyl bromide, 1,1,2,2-tetrabromoethane, 1,1,1-trichloroethane, trichloromethylbenzene, trifluoromethylbenzene, 1,2,3-tribromopropane, 1-bromo-2-chloroethane, cis-bromochloroethylene, o-bromochlorobenzene, i-butyl iodide, i-propyl iodide, ethyl iodide, n-butyl iodide, t-butyl iodide, n-propyl iodide, methyl iodide, etc. Of these, 1,2-dichloroethane, 1,1-dichloroethane, cis-1,2-dichloroethylene, 1,4-dichlorobutane, 1,2-dichloropropane, 2,2-dichloropropane, o-dichlorobenzene, i-propyl bromide, ethyl bromide, sec-butyl bromide, t-butyl bromide, trifluoromethylbenzene and t-butyl iodide are preferred and 1,2-dichloroethane, 1,1-dichloroethane, 2,2-dichloropropane, o-dichlorobenzene, ethyl bromide, i-propyl bromide, t-butyl bromide, and 1,2-dichloropropane are most preferred.

As the solvent which may be used upon contacting respective ingredients according to methods (ii) to (iv), and (vi), halogenated hydrocarbons or a mixture of halogenated hydrocarbon with a liquid titanium halide compound (the latter being in a proportion of not more than 60% by volume), preferably titanium tetrachloride, or with an aliphatic saturated hydrocarbon, alicyclic saturated hydrocarbon, or aromatic hydrocarbon are preferred. As the halogenated hydrocarbons, the same compounds as with the case of the methods (i), (v), and (vii) are preferred. With methods (ii) to (iv), and (vi), the use of a halogenated hydrocarbon with a high dielectric constant (preferably not less than 6) provides a high isotactic index and a high polymerization activity per unit weight of titanium and, as a result, improves the yield of polymer per unit weight of solid catalyst component (I) and isotactic index, though the content of supported titanium in the solid catalyst component (I) is reduced.

In methods (i) to (vii), preferred solvents for washing are aliphatic saturated hydrocarbons, alicyclic saturated hydrocarbons, aromatic hydrocarbons, kerosene, light oil, or mixtures thereof. Of these, aliphatic hydrocarbons, alicyclic saturated hydrocarbons, kerosene, and the mixtures thereof are more preferred, with hexane, heptane, cyclohexane, and kerosene being most preferred.

(3) Molar ratios

Molar ratios of ingredients A, B, C and D for preparing the solid catalyst component are not particularly limited as long as the effects of this invention can be obtained, i.e., high polymerization activity and improved stereoregularity. Usually, ingredient B is used in an amount of about 0.01 to 10 mols, preferably about 0.05 to 1 mol, ingredient C in an amount of about 0.001 to 1,000 mols, preferably about 0.005 to 100 mols, and ingredient D in an amount of about 0.001 to 1 mol, preferably about 0.01 to 0.5 mol, per mol of ingredient A.

The optimal molar ratios of these ingredients for preparing the solid catalyst component vary depending upon the preparation method. In the methods (i), (v) and (vii) for preparing the aforesaid solid catalyst component, ingredient B is generally used in an amount of about 0.01 to 10 mols, preferably about 0.05 to 1.0 mol, more preferably about 0.05 to 0.6 mol, ingredient C is used in an amount of about 0.001 to 1,000 mols, usually about 0.005 to 100 mols, preferably not less than 0.1 mol, more preferably not less than 0.5 mol, per mol of ingredient A. The upper limit of ingredient C is not particularly limited, and it may be used in large excess as a solvent. However, too excess a use is economically disadvantageous. Thus, usually it is sufficiently used in an amount of not more than about 100 mols per mol of ingredient A. Ingredient D is usually used in an amount of about 0.001 to 1 mol, preferably about 0.01 to 0.5 mol, more preferably about 0.02 to 0.3 mol, per mole of ingredient A.

Also, in methods (ii), (iii), (iv) and (vi), ingredient B is usually used in an amount of about 0.05 to 2 mols, preferably about 0.1 to 1 mol, more preferably about 0.1 to 0.5 mol per mol of ingredient A; ingredient C is used in an amount of about 0.1 to 8 mols, preferably about 0.2 to 5 mols, more preferably about 0.5 to 3 mols, per mol of ingredient B; and ingredient D is used in an amount of about 0.001 to 1 mol, preferably about 0.01 to 0.5 mol, more preferably about 0.02 to 0.3 mol per mol of ingredient A.

In the case of further adding halides of elements of Group IVb, Vb, or VIb in the Periodic Table upon co-pulverization, these compounds are usually added in an amount of about 0.001 to 1 mol, preferably about 0.01 to 0.5 mol, per mol of ingredient A but, in order to fully obtain the effects of the present invention, they should be added in an amount of not exceeding the amount of ingredient D in terms of the molar ratio.

In the case of treating the titanium-containing solid with a halogen or an interhalogen compound, the halogen or the interhalogen compound is usually used in an amount of about 0.001 to 20 mols, preferably about 0.005 to 10 mols per gram atom of titanium contained in the titanium-containing solid.

II. Organometallic compound of a metal of Group I, II or III in the Periodic Table As the organometallic compound used as catalytic component II, organometallic compounds of metals of Groups I to III in the Periodic Table, preferably organometallic compounds of Group IIIb metals, more preferably organometallic compounds of aluminum, are used. As the organometallic compounds of aluminum, those represented by the following general formula are suitable:

$$R_aAlX_{3-a}$$

wherein R represents an aromatic or aliphatic (preferably an aliphatic) hydrocarbon residue containing about 1 to 20 carbon atoms; X represents a halogen atom (e.g., F, Cl, Br, I) or a hydrogen atom; and a represents a number satisfying the relationship $2 \leq a \leq 3$. Specific examples of such organoaluminum compounds are illustrated below:

(1) Trihydrocarbylaluminum compounds such as trimethylaluminum, triethylaluminum, tri-n-propylaluminum, triisobutylaluminum, triisoprenylaluminum, tri-n-hexylaluminum, tri-n-octylaluminum, tri-n-dodecylaluminum, etc.

(2) Dihydrocarbylaluminum hydrides such as dimethylaluminum hydride, diethylaluminum hydride, diisobutylaluminum hydride, dioctylaluminum hydride, di-n-decylaluminum hydride, etc.

(3) Dihydrocarbylaluminum chlorides such as dimethylaluminum chloride, diethylaluminum chloride, diisobutylaluminum chloride, di-n-hexylaluminum chloride, di-n-octylaluminum chloride, di-n-dodecylaluminum chloride, etc.

An electron donor may be used as an additional catalyst component. In many cases, there results an improvement in stereoregularity as compared with the case where the electron donor is not present. As the electron donor, aromatic carboxylic acid esters described with respect to ingredient C of the solid catalyst component are preferred. The electron donors can fully exhibit their effects when used by separately adding the organometallic compound and the electron donor to a polymerization reactor as well as when used by previously contacting the donor with the organometallic compound.

The electron donors may be used in an amount of about 0.01 to 10 mols, preferably about 0.05 to 1 mol, more preferably about 0.05 to 0.7 mol per mol of the organometallic compound.

Where the component II is composed of the organometallic compound alone, it is usually used in an amount of about 0.1 to 500 mols, preferably about 0.5 to 100 mols per mol of ingredient C. Where the catalyst component II contains the electron donor, the amount of the organometallic compound varies depending upon the amount of the electron donor, but it is preferably used in the same amount as or more than its amount in the electron donor-free catalyst system. In this case the amount of an organoaluminum compound is about 1 to 1,500 mols, preferably about 5 to 1,000 mols, most preferably about 10 to 800 mols, per mol of ingredient C.

III. Polymerization of α-olefin

The catalyst of the present invention can be used for the homopolymerization of ethylene or α-olefins containing 3 or more carbon atoms such as propylene, butene-1, pentene-1, hexene-1, octene-1, decene-1, 3-methyl-butene-1, 3-methyl-pentene-1, 4-methyl-pentene-1, 3,3-dimethyl-butene-1, 3-methyl-hexene-1, 4-methyl-hexene-1, allylcyclopentane, styrene, vinylcyclohexene, etc., copolymerization between them, or copolymerization between these α-olefins and monomers copolymerizable with them (e.g., butadiene, isoprene, 1,4-hexadiene, ethylidenenorbornene, etc.).

Preferably the catalyst of the present invention can be used for the homopolymerization of ethylene, propylene, butene-1, or 4-methyl-pentene-1, copolymerization between them, or copolymerization between them and other α-olefins containing 4 to 10 carbon atoms (the proportion of the latter being up to 50 wt%, preferably up to 30 wt%) and more preferably the catalyst can be used for homopolymerization of propylene, butene-1 or 4-methyl-pentene-1, copolymerization among them, or copolymerization among them and ethylene or α-olefin containing 4 to 8 carbon atoms.

As to polymerization conditions and polymerization processes, those conventionally used for polymerizing olefins using a so-called Ziegler-Natta catalyst can be employed. For example, the catalyst of the present invention can be applied to any of a slurry or a solution polymerization process at room temperature to 200° C. under ordinary pressure to 100 atmospheres pressure in an inert solvent, a liquid phase process using liquefied monomer or monomers as solvent, and a gas phase process of polymerizng with maintaining monomers in a gas phase without using solvents. The amount of the solid catalyst component used in polymerization corresponds to ingredient C contained in the solid catalyst component in an amount of 0.001 to 5 mmols, preferably 0.002 to 0.5 mmol, most preferably 0.004 to 0.2 mmol, per 1 liter of polymerization reaction vessel. Also, the molecular weight of the resulting polymer can easily be controlled by adding, upon polymerization, conventionally known molecular weight-controlling agents such as hydrogen, organozinc compounds, and halogenated hydrocarbons. Hydrogen is most favored for this purpose.

EXAMPLE 1

Preparation of the solid catlayst component 20 g of magnesium chloride, 6 ml of ethyl benzoate, and 3 g of trimethylsiloxyaluminum dichloride were placed in a vessel (made of stainless steel; volume: 1.2 l; containing stainless steel balls of 12.7 mm in diameter in an apparent volume of 1.1 l) of a vibrational mill, and pulverized together for 12 hours under the conditions of 3.5 mm in amplitude, 24.2 Hz, and 8.3 G in acceleration. 8 g of the white co-pulverized product was placed in a three-necked flask, and 40 ml of hexane and 40 ml of titanium tetrachloride were added thereto, followed by reacting at 80° C. for 2 hours. A solid product was separated from the liquid phase, washed ten times each time with 50 ml of hexane to obtain the solid catalyst component. This component contained 2.33 wt% titanium.

Polymrization of propylene (Process 1)

8.0 mg of triethylaluminum and 0.5 mg (calculated as titanium atom) of the above-described solid catalyst component were charged to a stainless steel-made autoclave having an inside volume of 1 liter, and 0.8 liter of liquid propylene was added thereto, followed by reacting at 70° C. for 1 hour. After completion of the reaction, the remaining propylene was purged to obtain 302 g of white polypropylene powder. The yield of this polypropylene corresponds to 603 kg per g of titanium and 14.1 kg per g of the solid catalyst component. (Hereinafter these values are abbreviated as CY(Ti) and CY(SC), respectively.) When this polypropylene was extracted for 6 hours with boiling n-heptane using a Soxhlet's extractor, the percentage of non-extracted residue was 93.4% (This percentage of nonextracted residue corresponds to the aforesaid I.I.).

Polymerization of propylene (Process 2)

Propylene was polymerized in the same manner as in process 1 except for using as the catalyst 40 mg of triethylaluminum, 18.8 mg of ethyl benzoate, and 0.5 mg (calculated as titanium atom) of the solid catalyst component. The yield of polypropylene was 216 g (CY(Ti)=433 kg/g-Ti; CY(SC)=10.1 kg/g-solid catalyst), and I.I. was 96.3%.

EXAMPLES 2-8

Solid catalyst components were prepared in the same manner as in Example 1 except for using various siloxyaluminum compounds as ingredient D in place of trimethylsiloxyaluminum dichloride, and propylene was polymerized according to process 1. The results obtained are shown in Table 1.

Comparative Example 1

A solid catalyst component was prepared in the same manner as in Example 1 except not using trimethylsiloxyaluminum dichloride, and propylene was polymerized according to process 1. The results obtained are shown in Table 1.

Comparative Example 2

A solid catalyst component was prepared in the same manner as in Example 1 except using 2 ml of silicon tetrachloride in place of trimethylsiloxyaluminum dichloride, and propylene was polymerized according to process 1. The results obtained are shown in Table 1.

Comparison of Examples 1 to 8 with Comparative Examples 1 and 2 reveals that the solid catalyst components of the present invention containing the siloxyaluminum compounds showed a higher polymerization activity per unit weight of titanium (leading to higher activity per unit weight of said solid catalyst component) and showed that polypropylene with a high I.I. was obtained in spite of a high titanium content in the solid catalyst component.

Comparative Examples 3 and 4

Example 1 was repeated except using tetraethoxysilane or ethoxyaluminum dichloride as ingredient D in place of trimethylsiloxyaluminum dichloride in Example 1. The results obtained are shown in Table 1.

It is seen from these Comparative Examples that the use of Si(OEt)$_4$ or EtOAlCl$_2$ in place of the siloxyaluminum compound of the present invention provided seriously low activity per unit weight of titanium and I.I., though titanium-supporting amount was large. Thus, the excellence of the siloxyaluminum compounds of the present invention can be understood.

Comparative Example 5

A solid catalyst component was prepared in the same manner as in Example 1 except using 20 g of magnesium hydroxychloride in place of magnesium chloride, and propylene was polymerized at 70° C. for 1 hour according to process 1. The results obtained are shown in Table 1.

TABLE 1

| Example or Comparative Example | Ingredient D | | Compound Added upon Pulverization | Ti Content in Solid Catalyst Component (%) | CY(SC) (kg/g-SC) | CY(Ti) (kg/g-Ti) | I.I. (%) |
|---|---|---|---|---|---|---|---|
| Example 2 | Triethylsiloxyaluminum dichloride | 3 g | — | 2.15 | 13.8 | 641 | 93.0 |
| Example 3 | Triethylsiloxyaluminum dichloride | " | $SiCl_4$ 2 ml | 1.67 | 12.1 | 725 | 96.3 |
| Example 4 | Triethylsiloxyaluminum dichloride | " | $SbCl_3$ 1 g | 1.83 | 11.8 | 644 | 95.8 |
| Example 5 | Triphenylsiloxyaluminum dichloride | 4 g | — | 1.98 | 13.7 | 692 | 94.2 |
| Example 6 | Trichlorosiloxyaluminum dichloride | 3 g | — | 1.77 | 12.3 | 695 | 95.1 |
| Example 7 | Reaction product between dimethylpolysiloxane (10 CS) and aluminum chloride (Si/Al = 1/1 atomic ratio) | 3 g | — | 2.06 | 13.3 | 646 | 93.1 |
| Example 8 | Reaction product between methyl hydrogen polysiloxane (20CS) and aluminum chloride (Si/Al = 1/1 atomic ratio) | 3 g | — | 2.21 | 12.4 | 561 | 92.4 |
| Comparative Example 1 | — | | — | 1.25 | 6.7 | 533 | 85.8 |
| Comparative Example 2 | — | | $SiCl_4$ 2 ml | 1.08 | 7.1 | 657 | 96.0 |
| Comparative Example 3 | Tetraethoxysilane | 3 g | — | 3.12 | 12.4 | 398 | 75.3 |
| Comparative Example 4 | Ethoxyaluminum dichloride | 3 g | — | 3.11 | 9.2 | 295 | 88.2 |
| Comparaive Example 5* | Trimethylsiloxyaluminum dichloride | 3 g | — | 2.54 | 0.65 | 25.5 | 58.8 |

*As the carrier, Mg(OH)Cl was used in place of $MgCl_2$.

EXAMPLES 9-11

20 g of magnesium chloride and a given amount of siloxyaluminum compound (ingredient D) were added to the pot of the same vibrational mill as used in Example 1, and co-pulverized for 12 hours. Then, 5.3 ml of ethyl benzoate was added thereto, and co-pulverized for 2 hours. Further, 5.3 ml of ethyl benzoate was added thereto, and co-pulverized for 2 hours. Finally, 7.4 ml of titaium tetrachloride was added thereto and co-pulverized for a further 24 hours. 8 g of the final co-pulverized product was placed in a three-necked flask, and a mixture of 75 ml of 1,2-dichloroethane and 25 ml of hexane was added thereto to make a slurry. Then, 0.2 g of iodine trichloride was added thereto and reacted at 75° C. for 2 hours. The solid product was separated and washed 7 times each time with 50 ml of hexane to obtain solid catalyst component.

Propylene was polymerized according to process 1 using this solid catalyst component and triethylaluminum. The results obtained are shown in Table 2.

TABLE 2

| Example No. | Ingredient D | | Ti Content in the Solid Catalyst (%) | CY (SC) | CY (Ti) | I.I. (%) |
|---|---|---|---|---|---|---|
| 9 | Trimethylsiloxyaluminum dichloride | 3 g | 2.28 | 14.8 | 649 | 93.1 |
| 10 | Reaction product between dimethylpolysiloxane (50CS) and aluminum chloride (Si/Al = 1/1 in atomic ratio) | 3 g | 2.30 | 13.3 | 578 | 92.7 |
| 11 | Reaction product between methylphenylpolysiloxane (100CS) and aluminum chloride (Si/Al = 1/1 in atomic ratio) | 3 g | 2.35 | 13.4 | 570 | 93.2 |

EXAMPLES 12 AND 13

Solid catalyst components were prepared in the same manner as in Example 1 except for using, upon copulverization, 6 ml of ethyl p-toluylate or 6 g of methyl α-naphthoate in place of ethyl benzoate, and propylene was polymerized according to process 1 at 70° C. for 1 hour. The results obtained are shown in Table 3.

TABLE 3

| Example No. | Ingredient B upon C. Pulverization | | Ti Content in Solid Catalyst Component | CY (SC) (kg/g-SC) | CY (Ti) (kg/g-Ti) | I.I. (%) |
|---|---|---|---|---|---|---|
| 12 | Ethyl p-toluylate | 6 ml | 2.23 | 11.6 | 518 | 96.5 |
| 13 | Methyl α-naphthoate | 6 g | 2.18 | 9.6 | 441 | 94.9 |

EXAMPLES 14 AND 15

Solid catalyst components were prepared in the same manner as in Example 1 except for changing the amount of trimethylsiloxyaluminum dichloride used upon co-pulverization, and propylene was polymerized according to process 1. The results obtained are shown in Table 4.

TABLE 4

| Example No. | Amount of Trimethylsiloxyaluminum Dichloride upon Co-Pulverization | Ti Content in the Solid Catalyst Component | CY (SC) (kg/g-SC) | CY (Ti) (kg/g-Ti) | I.I. (%) |
|---|---|---|---|---|---|
| 14 | 0.5 | 1.66 | 10.3 | 621 | 93.0 |

TABLE 4-continued

| Example No. | Amount of Trimethylsiloxy-aluminum Dichloride upon Co-Pulverization | Ti Content in the Solid Catalyst Component | CY (SC) (kg/g-SC) | CY (Ti) (kg/g-Ti) | I.I. (%) |
|---|---|---|---|---|---|
| 15 | 6.0 | 2.08 | 11.9 | 574 | 92.8 |

EXAMPLES 16114 24

Solid catalyst components were prepared in the same manner as in Example 1 except for changing the amount of trimethylsiloxyaluminum dichloride (ingredient D) and the kind and the amount of aromatic carboxylic acid ester (ingredient B) used upon co-pulverization, and changing the solvent and temperature upon contacting the copulverized product with titanium tetrachloride. Propylene was polymerized according to the following process.

Polymerization of propylene (Process 3)

0.5 liter of n-heptane, 143 mg of triethylaluminum, 0.418 mmol of ethyl p-toluylate, and 0.5 mg (calculated as Ti atom) of the solid catalyst component were added, in this order, to a stainless steel-made autoclave having an inside volume of 1 liter. Then, 100 ml of hydrogen (calculated at 0° C., 1 kg/cm$^2$) was added thereto, and a propylene gas was pressed thereinto. Propylene was polymerized at 65° C. for 1.5 hours while maintaining the total pressure at 9 kg/cm$^2$. After completion of the polymerization, solid crystalline polypropylene was separated from the liquid phase by filtration. After drying, it was extracted with boiling n-heptane for 6 hours. (Proportion(wt%) of the non-extracted residue based on the solid polypropylene is abbreviated as I.I.) On the other hand, amorphous polypropylene (atactic polypropylene) was recovered by distilling off the solvent from the solution. The results obtained are shown in Table 5.

this order, to a 1 liter autoclave. 100 ml of hydrogen gas (calculated at 0° C., 1 kg/cm$^2$) was added thereto, and 0.8 liter of liquid 1-butene was added thereto, followed by reacting at 60° C. for 2 hours. The results obtained are shown in Table 6.

EXAMPLE 26

4-Methyl-1-pentene was polymerized in the same manner as in Example 25 except for using 0.8 liter of 4-methyl-1-pentene in place of liquid 1-butene at 50° C. for 5 hours. The results obtained are shown in Table 6.

EXAMPLE 27

Random copolymerization between propylene and ethylene was conducted in the same manner as in Example 16 except for using a gas mixture of propylene and ethylene containing 2 wt% ethylene in palce of propylene gas. The reaction mixture was filtered to obtain 261 g of a white powdery copolymer. On the other hand, 8.9 g of an amorphous copolymer was obtained from the filtrate. The results obtained are shown in Table 6.

EXAMPLE 28

Random copolymerization between propylene and 1-hexene was conducted in the same manner as in Example 16 except for using 0.45 liter of n-heptane and 0.05 liter of 1-hexene (as a monomer) in place of n-heptane. 251 g of a solid copolymer was obtained by filtration, whereas 8.3 g of an amorphous copolymer was obtained from the filtrate. The results obtained are shown in Table 6.

EXAMPLE 29

Random copolymerization between propylene and 4-methyl-1-pentene was conducted in the same manner as in Example 16 except for using 0.25 liter of n-heptane and 0.25 liter of 4-methyl-1-pentene (as a monomer) in place of n-heptane. 243 g of a white powdery copolymer was obtained by filtration, whereas 7.6 g of an

TABLE 5

| | Co-Pulverization | | | Reaction between the Co-Pulverized Product and TiCl$_4$ | | | Ti Content in the Solid Catalyst Component (%) | Yield of Atactic Polypropylene (%) | CY(SC) (kg/g-SC) | CY(Ti) (kg/g-Ti) | I.I. (%) |
|---|---|---|---|---|---|---|---|---|---|---|---|
| Ex. No. | Ingredient D* (g) | Ingredient B (ml) | | Solvent (ml) | TiCl$_4$ (ml) | Temp. (°C.) | | | | | |
| 16 | 3 | Ethyl Benzoate | 9 | 1,2-Dichloro-ethane | 40 | 40 | 80 | 2.03 | 1.5 | 10.5 | 518 | 96.0 |
| 17 | " | Ethyl Benzoate | " | Tetrachloro-ethylene | 40 | " | " | 1.67 | 1.9 | 6.3 | 375 | 95.7 |
| 18 | " | Ethyl Benzoate | " | o-Dichloro-benzene | 40 | " | 100 | 2.77 | 1.6 | 14.1 | 509 | 96.5 |
| 19 | " | Ethyl Benzoate | " | o-Dichloro-benzene | 75 | 5 | " | 1.80 | 1.6 | 8.7 | 481 | 95.8 |
| 20 | " | Ethyl Benzoate | " | 1,2-Dichloro-propane | 40 | 40 | 80 | 2.00 | 1.5 | 10.6 | 530 | 97.0 |
| 21 | " | Ethyl p-toluylate | 9 | o-Dichloro-benzene | 40 | " | 100 | 2.83 | 1.4 | 14.8 | 524 | 96.1 |
| 22 | 4 | Ethyl Benzoate | 12 | o-Dichloro-benzene | " | " | " | 2.46 | 1.3 | 12.2 | 495 | 96.1 |
| 23 | " | Ethyl p-toluylate | 12 | o-Dichloro-benzene | " | " | " | 2.50 | 1.3 | 12.8 | 510 | 96.4 |
| 24 | " | Ethyl p-toluylate | " | 1,2-Dichloro-ethane | 40 | " | 90 | 2.42 | 1.4 | 11.6 | 479 | 95.8 |

Ingredient D*:Trimethylsiloxyaluminum dichloride.

EXAMPLE 25

143 mg of triethylaluminum, 0.418 mmol of ethyl p-toluylate, and 0.5 mg (calculated as Ti atom) of the solid catalyst component of Example 16 were added, in amorphous copolymer was obtained from the filtrate. The results obtained are shown in Table 6.

EXAMPLE 30

Random copolymerization between propylene and 1-butene was conducted in the same manner as in Example 25 except for using a 3-liter autoclave in place of the 1-liter autoclave and 1.5 liters of n-heptane, 0.3 liter of propylene, and 0.2 liter of liquid 1-butene in place of 0.8 liter of liquid 1-butene. After completion of the copolymerization, the reaction mixture was poured into a large amount of methanol to precipitate and recover a resulting copolymer. The results are shown in Table 6.

EXAMPLE 31

Propylene was polymerized for 60 minutes according to Example 16, followed by purging the gas within the autoclave to reduce the total pressure to 1.0 kg/cm². Then, ethylene gas was continuously fed into the autoclave and the total pressure was kept at 2 kg/cm² for 10 minutes, followed by again purging the gas to the degree of no residual pressure remaining. Then, a hydrogen gas and an ethylene gas were fed into the autoclave both up to the partial pressure of 4.5 kg/cm², followed by further reacting for 30 minutes to conduct block copolymerization between propylene and ethylene partly involving random copolymerization thereof. The results obtained are shown in Table 6.

TABLE 6

| Ex. No. | Monomer | Type of Polymerization | Polymerization Temp. (°C.) | Yield (g) | CY(Ti) (kg/g-Ti) | CY(SC) (kg/g-SC) | Polymer Composition (wt %) | Notes |
|---|---|---|---|---|---|---|---|---|
| 25 | 1-Butene | Liquid phase | 60 | 257 | 514 | 10.4 | — | *1 |
| 26 | 4-Methyl-1-pentene | Liquid phase | 50 | 91.3 | 183 | 3.71 | — | *2 |
| 27 | Propylene/ Ethylene | Slurry | 65 | 270 | 540 | 11.0 | Propylene: 92.4 Ethylene: 7.6 | *3 |
| 28 | Propylene/ n-Hexene | Liquid phase | 65 | 259 | 518 | 10.5 | Propylene: 91.4 1-Hexene: 9.6 | *4 |
| 29 | Propylene/ 4-Methyl-1-pentene | Liquid phase | 65 | 251 | 501 | 10.2 | Propylene: 90.9 4-Methyl-1-pentene: 10.1 | *5 |
| 30 | Propylene/ 1-Butene | Solution | 60 | 221 | 442 | 8.97 | Propylene: 70.7 1-Butene: 29.3 | *6 |
| 31 | Propylene/ Ethylene | Slurry | 65 | 275 | 550 | 11.2 | Propylene: 73.0 Ethylene: 27.0 | *7 |

*1 Content of residue non-extracted from the polymer with boiling ether was 98.6%.
*2 Content of residue non-extracted from the polymer with boiling n-heptane was 98.2%.
*3 Content of residue non-extracted from the copolymer with boiling n-heptane was 78.1%.
*4 Content of residue non-extracted from the copolymer with boiling n-heptane was 64.5%.
*5 Content of boiling n-heptane solubles in the copolymer was 8.6%.
*6 Content of boiling methyl acetate solubles in the copolymer was 0.8%.
*7 Content of boiling n-heptane solubles in the copolymer was 8.3%.

While the invention has been described in detail and with reference to specific embodiments thereof, it will be apparent to one skilled in the art that various changes and modifications can be made therein without departing from the spirit and scope thereof.

What is claimed is:

1. A process for producing an α-olefin polymer which comprises homopolymerizing an α-olefin selected from the group consisting of propylene, butene-1, and 4-methylpentene-1, or copolymerizing two or more of said α-olefins or one or more of said α-olefins and ethylene or an α-olefin containing 4 to 8 carbon atoms in the presence of a catalyst consisting essentially of:

(I) a solid catalyst component prepared by contacting with each other, (A) a magnesium dihalide of the formula $MgX_2$ where x is a halogen atom, (B) an aromatic carboxylic acid ester, (C) titanium tetrachloride, and (D) a siloxyaluminum compound selected from the group consisting of trimethylsiloxyaluminum dichloride, triethylsiloxyaluminum dichloride, triphenyl-siloxyaluminum dichloride, trichlorosiloxyaluminum dichloride, a reaction product of dimethylpolysiloxane and aluminum chloride, a reaction product of methylphenylpolysiloxane and aluminum chloride, or a reaction product of methylhydrogenpolysiloxane and aluminum chloride; and (II) organometallic compound of a metal of Groups I, II or III in the Periodic Table, wherein ingredient B is used in an amount of about 0.01 to 10 mols, ingredient C in an amount of about 0.001 to 1,000 mols, and ingredient D in an amount of about 0.001 to 1 mol, per mol of ingredient A; and wherein said ingredients A, B and D are pulverized together, contacted with ingredient C in a slurry state, and washed.

2. The process of claim 1, wherein a pulverized mixture of said ingredients A, B, C and D is treated with a halogen or an interhalogen compound in a halogenated hydrocarbon and washed.

3. The process of claim 1, wherein ingredient A is $MgCl_2$.

4. The process of claim 1, wherein ingredient B is represented by the formulae (A) or (B):

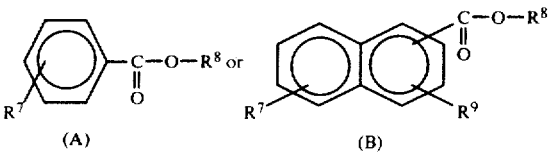

wherein $R^7$ and $R^9$ each represents a hydrogen atom, a hydrocarbon residue containing about 1 to 20 carbon atoms, or an alkoxy or aryloxy group containing about 1 to 20 carbon atoms and $R^8$ represents a hydrocarbon residue or a halogenated hydrocarbon residue containing about 1 to 20 carbon atoms.

5. The process of claim 4, wherein ingredient B is represented by formula (A).

6. The process of claim 5, wherein ingredient B is selected from the group consisting of methyl benzoate, ethyl benzoate, isopropyl benzoate, methyl toluylate, ethyl toluylate, methyl anisate, and ethyl anisate.

7. The process of claim 1, wherein ingredient C is represented by the formula:

$$Ti(OR^{10})_m X_{4-m}$$

wherein $R^{10}$ represents a hydrocarbon residue containing about 1 to 15 carbon atoms. X represents a chlorine or a bromine atom and m is a number of 0 to 3.

8. The process of claim 1, wherein said solid catalyst component is prepared by contacting said ingredients A, B, C and D with a halide of an element of Groups IVb, Vb and VIb of the Periodic Table.

9. The process of claim 8, wherein said halide is used in an amount of about 0.001 to 1 mol per mol of ingredient A.

10. The process of claim 1, wherein said organometallic compound is an organo compound of a metal of Group IIIb of the Periodic Table.

11. The process of claim 10, wherein said organometallic compound is an organoaluminum compound.

12. The process of claim 11, wherein said organoaluminum compound is represented by the formula:

$$R_a AlX_{3-a}$$

wherein R represents a hydrocarbon residue containing about 1 to 20 carbon atoms, X represents a halogen atom or a hydrogen atom, and a is a number satisfying the relationship $2 \leq a \leq 3$.

13. The process of claim 1, wherein said catalyst additionally comprises an electron donor compound.

14. The process of claim 1, wherein said contact is carried out in a solvent and said solvent is a halogenated hydrocarbon having a dielectric constant of not less than about 6 at 10° to 50° C.

15. The process of claim 14, wherein said halogenated hydrocarbon is selected from the group consisting of 1,2-dichloroethane, 1,1-dichloroethane, 2,2-dichloroethane, o-dichlorobenzene, ethyl bromide, isopropyl bromide, t-butyl bromide and 1,2-dichloropropane.

* * * * *